United States Patent
Sandor et al.

(10) Patent No.: US 7,734,531 B1
(45) Date of Patent: Jun. 8, 2010

(54) METHOD FOR PROMOTING SULFUR DIOXIDE FUTURES TRADING

(75) Inventors: Richard Sandor, Chicago, IL (US); Michael Walsh, Downers Grove, IL (US)

(73) Assignee: Chicago Climate Exchange, Inc., Chicago, IL (US)

( * ) Notice: Subject to any disclaimer, the term of this patent is extended or adjusted under 35 U.S.C. 154(b) by 627 days.

(21) Appl. No.: 11/250,610

(22) Filed: Oct. 17, 2005

Related U.S. Application Data

(60) Provisional application No. 60/620,185, filed on Oct. 18, 2004.

(51) Int. Cl.
*G06Q 40/00* (2006.01)
(52) U.S. Cl. .......................................... 705/37
(58) Field of Classification Search .................. 705/35, 705/37
See application file for complete search history.

(56) References Cited

U.S. PATENT DOCUMENTS

| | | | |
|---|---|---|---|
| 4,677,552 A | 6/1987 | Sibley, Jr. .................... | 364/408 |
| 5,532,928 A | 7/1996 | Stanczyk et al. ............. | 364/406 |
| 5,621,654 A | 4/1997 | Cohen et al. ................. | 364/493 |
| 5,664,112 A | 9/1997 | Sturgeon et al. .............. | 705/28 |
| 5,726,884 A | 3/1998 | Sturgeon et al. ............. | 395/209 |
| 5,794,212 A | 8/1998 | Mistr, Jr. ..................... | 705/26 |
| 6,067,549 A | 5/2000 | Smalley et al. ............... | 707/104 |
| 6,112,188 A | 8/2000 | Hartnett ........................ | 705/35 |
| 6,115,698 A | 9/2000 | Tuck et al. .................... | 705/37 |
| 6,256,640 B1 | 7/2001 | Smalley et al. ............... | 707/104 |
| 6,560,580 B1 | 5/2003 | Fraser et al. ................... | 705/37 |
| 2001/0032168 A1 * | 10/2001 | Adamson et al. .............. | 705/37 |
| 2001/0049651 A1 | 12/2001 | Selleck ......................... | 705/37 |
| 2002/0143693 A1 | 10/2002 | Soestbergen et al. .......... | 705/37 |
| 2003/0055665 A1 | 3/2003 | Fleming ........................ | 705/1 |
| 2003/0085179 A1 | 5/2003 | Kim et al. .................... | 210/739 |
| 2003/0229572 A1 | 12/2003 | Raines et al. ................. | 705/37 |
| 2004/0015454 A1 | 1/2004 | Raines et al. ................ | 705/412 |
| 2004/0039684 A1 | 2/2004 | Sandor ......................... | 705/37 |
| 2005/0246190 A1 | 11/2005 | Sandor et al. .................. | 705/1 |

FOREIGN PATENT DOCUMENTS

| | | |
|---|---|---|
| WO | WO 02/37433 A2 | 5/2002 |
| WO | WO 02/37776 A2 | 5/2002 |
| WO | WO 02/077776 A2 | 10/2002 |

(Continued)

OTHER PUBLICATIONS

"Tradable Emissions" Chairman Jim Saxton, Jul. 1997 http://www.house.gov/jec/cost-gov/regs/cost/emission.pdf.*

(Continued)

*Primary Examiner*—James A. Kramer
*Assistant Examiner*—James A Vezeris
(74) *Attorney, Agent, or Firm*—Winston & Strawn LLP

(57) ABSTRACT

Computer-based methods for promoting sulfur dioxide futures contracts trading are described. The methods include creating a sulfur financial instrument for use by approved parties to trade sulfur emissions allowances and selling the sulfur financial instrument to an approved buyer who desires to acquire the amounts of the sulfur dioxide emissions allowances. The sulfur financial instrument represents allocated amounts of sulfur emissions allowances that include a future year sulfur dioxide allowance vintage.

30 Claims, 1 Drawing Sheet

FOREIGN PATENT DOCUMENTS

| WO | WO 02/086657 A2 | 10/2002 |
| --- | --- | --- |
| WO | WO 2004/010366 A2 | 1/2004 |

OTHER PUBLICATIONS

"Delivery Risk and the Hedging Role of Options" Donald Lien and Kit Pong Wong Journal of Futures Markets, vol. 22, Issue 4 (p. 339-354) http://www3.interscience.wiley.com/cgi-bin/fulltext/90510859/PDFSTART.*

"Volume and Volatility Surrounding Quarterly Redesignation of the Lead S&P 500 Futures Contract" Ira G Kawaller, Paul D Koch, and John E. Peterson Journal of Futures Markets, vol. 21, Issue 12 (p. 1119-1149) http://www3.interscience.wiley.com/cgi-bin/fulltext/85514898/PDFSTART.*

Trading Futures in Dirty Air; Here's a Market-Based Way to Fight Global Warming; [Final Edition] Ricardo Bayon. The Washington Post. Washington, D.C.: Aug. 5, 2001. p. B.02 http://proquest.umi.com/pqdweb?index=13&did=77024691&SrchMode=2&sid=4&Fmt=3&VInst=PROD&VType=PQD&RQT=309&VName=PQD&TS=1229903595&clientId=19649.*

"Trading Futures in Dirty Air" by Ricardo Bayon.*

Sandor, R., "Implementation Issues: Market Architecture and The Tradeable Instrument," Chapter IX, pp. 151-166, United Nations Conference on Trade and Development, May 1992.

Sandor, R., "Statement to The Prague Meeting on Sustainable Development," Jan. 14, 1995.

Sandor, R., "Getting Started with a Pilot: The Rationale for a Limited-Scale Voluntary International Greenhouse Gas Emissions Trading Program," Hearing before the Committee on Energy and Natural Resources United States Senate, One Hundred Fifth Congress, First Session, Sep. 30, 1997 and presentation at The White House Conference on Climate Change, Oct. 6, 1997.

Sandor, R., Statement to The Hearing before The Committee on Energy and Natural Resources of The U.S. Senate, One Hundred Fifth Congress, First Session, The Impacts of a New Climate Treaty on U.S. Labor, Electricity Supply, Manufacturing and The General Economy, Sep. 30, 1997.

Sandor, R., "Trading Gases," Our Planet Magazine, The United Nations Environment Programme Magazine for Environmentally Sustainable Development, vol. 9, No. 6, 1998.

Sandor, R., "Corporate Giants to Aid Design of U.S. Carbon Market," Environmental Finance Magazine, Jun. 2001.

Solomon, B., et al., "Emissions Trading Systems and Environmental Justice," Environment; Washington, 42:8, Oct. 2000, pp. 32-45.

Sandor, R., "$SO_2$ Market Exceeds Expectations," Environmental Finance, p. 11, May 2000.

Kiesling, L., "CO2 Emissions Trading, The Coase Theorem, and Creating New Markets," The Reason Foundation, Oct. 23, 2002.

"The Chicago Climate Exchange: Trading Hot Air," The Economist edition, Oct. 17, 2002.

"Chicago Climate Exchange: Rothschild to Advise CCX on Equity Offering," The Financial Times, Nov. 4, 2002.

Sandor, R. (Chairman & CEO, Environmental Financial Products, LLC), "Statement to the U.S. Senate Environment and Public Works Committee," Mar. 24, 1999 Hearing on Credit for Voluntary Early Actions.

Sandor, R., "Toward an International $CO_2$ Entitlement Spot and Futures Market," Ch. 3.2, pp. 221-236, excerpt from *Market-based Approaches to Environmental Policy: Regulatory Innovations to the Fore*, eds. R.F. Kosobud, et al.

"Designing Options for Implementing an Emissions Trading Regime for Greenhouse Gases in the European Community," Final Report, Feb. 22, 2000.

Non Final Office Action Mailed Dec. 1, 2009 for U.S. Appl. No. 11/929,431 filed Oct. 30, 2007.

* cited by examiner

US 7,734,531 B1

METHOD FOR PROMOTING SULFUR DIOXIDE FUTURES TRADING

REFERENCES TO RELATED APPLICATIONS

This application claims the benefit under 35 U.S.C. §119(e) of U.S. Patent Application No. 60/620,185, filed on Oct. 18, 2004.

BACKGROUND

The present invention generally relates to a method and system for promoting sulfur dioxide futures trading.

The world's environment faces significant threats from anthropogenic or "human-caused" releases of greenhouse gases to the atmosphere. Greenhouse gases, such as water vapor, carbon dioxide, tropospheric ozone, nitrous oxide, and methane, are generally transparent to solar radiation but opaque to longwave radiation, thus preventing longwave radiation energy from leaving the atmosphere. The net effect of greenhouse gases in the atmosphere is a trapping of absorbed radiation and a tendency to warm the planet's surface.

Greenhouse gases can be released, for example, by the release of carbon dioxide during fossil fuel combustion. Thus, automobiles, factories, and other devices that combust fuel release carbon dioxide gases into the atmosphere. However, greenhouse gases can also be released by more natural means. For example, farmers may till farmland such that carbon dioxide from the tilled ground is released into the air. The removal of forest stands, or deforestation, can also result in the release of greenhouse gases.

The rapid increase in the concentration of greenhouse gases in the earth's atmosphere caused by human activity increases the risk of fundamental and costly changes in the earth's climate system. For example, the changes may include more severe drought/precipitation cycles, longer and more extreme heat waves, the spread of tropical diseases, damage to vegetation and agricultural systems, and threats to coastlines and property due to higher sea levels and storm surges.

In the 1980's, the United States implemented an emissions trading system to phase out lead from motor fuel. This effort was followed by a highly successful U.S. Environmental Protection Agency (EPA) sulfur dioxide ($SO_2$) emissions trading program. To reduce acid rain, an overall cap on $SO_2$ emissions was imposed on electric power plants. Utilities that found it expensive to cut sulfur emissions could buy allowances from utilities that make extraordinary cuts at low cost.

Tradeable $SO_2$ allowances are an integral element of the United States Clean Air Act (as amended in 1990) program that requires a major reduction in emissions released by electric power plants. Tradeable emission allowances are issued by the U.S. Environmental Protection Agency (EPA) to each fossil-fueled electric power plant in an amount corresponding to each plant's nominal emission limit. The total quantity of issued allowances corresponds to the national emission limit. Each spring every power plant must relinquish to the EPA a quantity of allowances that equals the prior-year emissions total (as quantified using required emission monitors). Those entities that reduce emissions below their allowance allocation are free to bank (for future use), or sell, their excess allowances. Plants that do not reduce emissions to the allowance allocation level must acquire allowances in order to achieve compliance. The market in tradeable $SO_2$ allowances has grown to a transaction value in excess of $4 billion per year. In the past year, prices have risen rapidly (from $200 to over $600 per ton) and have become very volatile. These developments have enhanced the need for a financially guaranteed and standardized instrument for use in price hedging and trading.

Each issued emission allowance (which exists as a serial number in the EPA's registry, called the "Allowance Tracking System") has a "vintage" assigned to it as part of its serial number. The EPA issues in advance a thirty-year stream of allowances. The vintage designates the first year the allowances can be used in compliance. For example, the first year allowances with a 2004 vintage can be relinquished to the EPA to meet emission limits is the 2004 compliance year, for which compliance is documented ("true-up") in early 2005. While an unused 2004 allowance is automatically "banked" (held in its owner's account) and can be used to meet emission limitation commitments for later years, a 2005 vintage allowance cannot be used in compliance to meet emission limits for years before 2005. That is, one cannot "borrow" from the future to meet current emission limits.

One implication of allowance vintages is that there are different market prices for different allowance vintages. The "spot" market involves trading in allowances usable in compliance to meet calendar year 2004 emission limits. Because banking is allowed, trading in 2004 vintage allowances is understood by market participants to include all allowances having a 2004 vintage, as well as all banked allowances having a vintage earlier than 2004. Consequently, market participants treat each allowance vintage later than 2004 as a distinct market. As a result, 2005 vintage allowances trade at prices slightly different from 2004 vintage allowances, and also trade at prices that are different from those of 2006 and 2007 allowances.

The art of designing successful futures contracts, defined as futures contracts that attract significant participation which facilitate low-cost execution of trades, requires the establishment of terms that provide market opportunities for a variety of entities. The contract specifications must serve the interests of hedgers (those who use the contracts to manage their existing exposure to adverse price changes in the underlying commodity) and traders, including speculators, who provide market liquidity trading with the goal of profiting from price changes.

Futures contracts are used by hedgers primarily for the purpose of protecting against economic loss due to adverse price changes in the underlying commodity. The great majority of futures contract positions (buy-side "long" positions and sell-side "short" positions) are netted out before the contract reaches its denoted expiration date. This netting occurs through the initiation of a position that is opposite the one the account holder held as expiration approaches. A holder of a long position will sell to get "flat" (out of the market), and the holder of a short position will buy to get "flat." Position holders that do not net out a long or short position before the futures contract expires become part of the delivery process. Those who stay "short" must deliver eligible instruments and those who remain "long" will be required to make payment and accept delivery.

A need therefore exists for an improved method and system that will promote successful $SO_2$ futures trading.

SUMMARY OF THE INVENTION

The invention now remedies the deficiencies of the prior art, and provides methods for promoting the trading of sulfur dioxide futures contracts. In particular, provided is a low-cost, financially guaranteed tool for managing exposure to price volatility in the market for sulfur dioxide ($SO_2$) emission allowances.

In one aspect, the invention relates to a method for promoting sulfur dioxide futures contracts trading. The method includes creating a sulfur financial instrument for use by approved parties to trade sulfur emissions allowances, and selling the sulfur financial instrument to an approved buyer who desires to acquire the amounts of the sulfur dioxide emissions allowances. The sulfur financial instrument represents allocated amounts of sulfur emissions allowances that include a future year sulfur dioxide allowance vintage.

The method could also include including allowances from prior or current years. According to a beneficial implementation, an approved party is a clearing participant or a trading party who has a sulfur dioxide registry account established with a central regulatory organization. The central regulatory agency may be the Environmental Protection Administration (EPA). In a variation, the parties are approved by a sulfur dioxide futures exchange based on predetermined criteria including at least one of creditworthiness, the emissions allowance amount, and membership in a regulatory organization.

According to an advantageous embodiment, the method also includes delivering the sulfur financial instrument. Delivery of the instrument is preferably facilitated by a clearing service provider. Typically, delivery will occur over three consecutive business days. The business days can include a position day, a notice day and a delivery day.

In another embodiment, the method further includes releasing payment to a seller after confirmation is received that a buyer has received the sulfur emissions allowance from a central regulatory agency. The method also preferably includes receiving reports of transfers of all or a portion of the sulfur financial instrument. Monitoring and approving at least one of all transfers and redemption of the sulfur financial instrument is advantageously included in the method.

In another advantageous implementation, the sulfur financial instrument expires on a preset expiration date. In particular, the sulfur financial instrument may be a quarterly contract.

Another aspect according to the invention also pertains to a process for promoting sulfur dioxide futures contracts trading. The method includes creating a sulfur financial instrument for use by approved parties to trade sulfur emissions allowances, and selling the sulfur financial instrument on an exchange platform associated with a computer network to an approved buyer who desires to acquire the amounts of the sulfur dioxide emissions allowances. The sulfur financial instrument represents allocated amounts of sulfur emissions allowances including a future year sulfur dioxide allowance vintage. In an implementation, the network is the Internet.

In one embodiment, the exchange platform is linked to a registry, and the registry is linked to a financial guarantee mechanism. In another embodiment, the method also includes delivering the sulfur financial instrument.

DETAILED DESCRIPTION OF THE PREFERRED EMBODIMENTS

Figure 1:
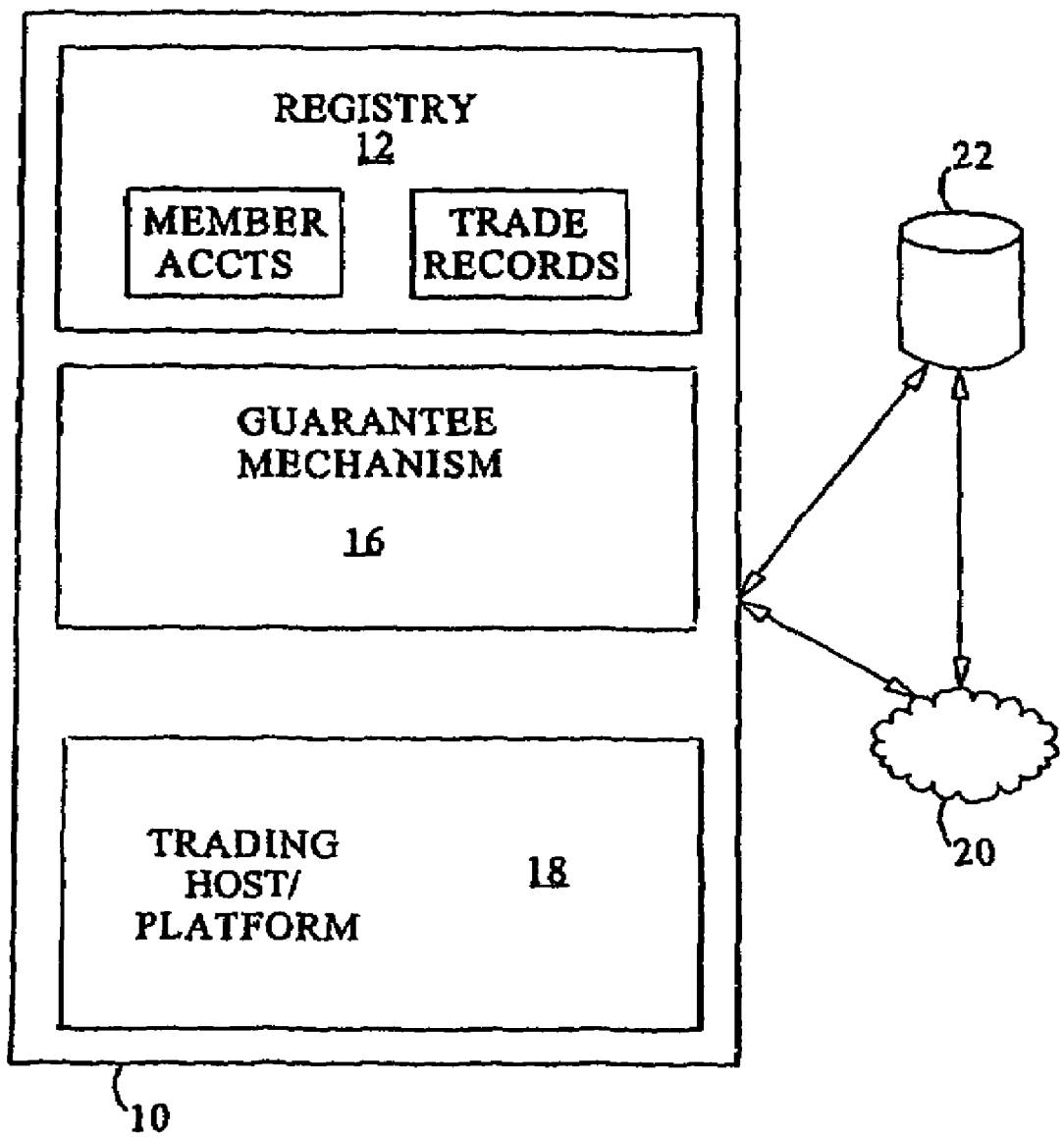
FIG. 1 is a simplified block diagram of an emissions reduction and trading system that may be used to trade sulfur dioxide futures contracts according to the invention.

Research into the nature of the $SO_2$ emission allowance market to identify futures contract specifications that may assist in building a successful and liquid futures market has revealed the following. Despite potential divergences that may arise due to tax, accounting or regulatory factors, market participants treat all prior-year $SO_2$ emission allowances as equivalent to current-year allowances, thus making their prices equal. Reflecting the time value of money (among other factors), $SO_2$ allowances having "next-year" vintage trade at a discount relative to current-year allowances, and this discount shrinks as the trade date approaches year-end. Lastly, the great majority of all $SO_2$ allowance trading involves trades for current vintage allowances (which the market treats as including all prior vintages) or next-year vintage allowances.

Among the lessons learned from a long history of futures contract designs are that trading is more active when the needs of market participants are adequately fulfilled. Examples of the objectives that must be met by contract specifications include providing terms that make the futures contract relevant and reliable for a wide range of hedgers and traders. In addition, provisions must be included that encourage trade by allowing traders to profit from unique specifications relating to instruments allowed for delivery against contracts that remain in place after expiration of the contract, and time period allowed for election to take or make delivery. To assure the contracts are useful for hedgers, contract terms must allow for a degree of convergence of prices of the underlying cash market instrument and prices of the associated futures contract. The balancing among these sometimes competing considerations is critical to establish a successful new $SO_2$ futures market.

A Sulfur Financial Instrument Futures Contract includes a novel and non-intuitive specification that reflects professional expertise and insights, informed by market research findings. In particular, futures contracts are prone to failure if the contracts are readily held until expiration and frequently used as a means of acquiring or making delivery of the underlying commodity. Thus, the Sulfur Financial Instrument Futures Contract according to the invention permits a non-traditional definition of allowance vintages acceptable for fulfilling delivery commitments upon expiration of the Sulfur Financial Instrument Futures Contracts.

While an obvious specification of the futures contract would allow for delivery of emission allowances having the vintage corresponding to the allowances that are current-year at the date of the contract expiration, the present contract design addresses the above considerations of successful contract elements by broadening the range of deliverable allowance vintages. Consequently, the Sulfur Financial Instrument Futures Contracts allows for delivery of emission allowances having a vintage corresponding to the year of contract expiration (i.e. current vintage allowances as well as all prior-year vintages), and, as an important innovation, will also allow for delivery of next-year allowance vintages.

For example, those entities that maintain a short (sell) open position of one contract in a Sulfur Financial Instrument Futures Contract that expires in March 2005 must meet their delivery commitments by delivering twenty-five emission allowances. The acceptable allowances can be any combination (adding up to twenty-five allowances) of allowances having 2005 vintage or earlier, and allowances having 2006 vintage. Allowing for delivery of next-year allowances in addition to current-year allowances is expected to provide the following benefits. It provides a hedging tool that relates to a larger share of the underlying cash market in emission allowances. It introduces risk and opportunity to the delivery process. Those who remain "long" at contract expiration risk being delivered allowances that are not usable until the subsequent compliance year, and to some degree this will discourage staying "long" as expiration approaches, thus fostering futures trading by necessitating the establishment of an offsetting "short" (sale). Those who remain "short" at contract expiration have the option to deliver next-year allowances, which may be available at a price lower than current-year vintage allowances and at a price below the futures contract settlement price. This feature fosters trading by introducing the ability to profit from arbitrage between the futures and cash market. As stated above, this design feature, termed "Expanded Range of Deliverable Allowances," is counterintuitive, and reflects the professional expertise and research findings of the inventors.

Specifications for implementation of a Sulfur Financial Instrument Futures Contract would include items such as contract size, quotation, minimum price or tick increment, trading hours, delivery months, first and last trading day, settlement price calculation, deliverable instruments, delivery process, price limits, reportable position limits, and nearby expiration month speculative position limits.

Settlement prices may be based, for example, on the following criteria: (a) a single traded price during the pre-close; (b) if more than one trade occurs during the pre-close, the trade volume weighted average of the prices, rounded to the nearest tick; (c) if no trade occurs during the pre-close, the volume weighted average of the last two trade prices; and (d) if there are no trades, the price midway between the best bid and offer (volume weighted) at the end of the pre-close rounded to the nearest tick. The exchange authority may reserve the right to take into account other factors in determining settlement prices, e.g. spread differentials between the contract months.

Table 1 illustrates an example of the salient features of a Sulfur Financial Instrument Futures Contract. Approved entities may create and trade such sulfur dioxide futures contracts with other approved entities. Clearing participants and parties trading in the market preferably have a $SO_2$ registry account established with the EPA. As discussed in more detail below, there are delivery procedures that must be followed according to a clearinghouse and the EPA.

TABLE 1

SULFUR FINANCIAL INSTRUMENT FUTURES CONTRACT SPECIFICATIONS

| | |
|---|---|
| Contract Size | 25 tons of $SO_2$ emission allowances |
| Quotation | US Dollars |
| Minimum Price/Tick Increments | $0.20 per ton or $5.00 per contract |
| Symbol | SFI |
| Trading Hours | 10:00 a.m.-12:30 p.m. Central Time |
| First Trading Day | The first business day following an expiration day |
| Last Trading Day | The last business day of the expiration month |
| Deliverable Instruments | $SO_2$ emission allowances issued by U.S. Environmental Protection Agency (EPA) and registered in the EPA Allowance Tracking System |
| Expiration Cycle | Quarterly contracts on a March, June, September, or December cycle; twelve quarterly contracts to be listed |
| Delivery Procedure | Delivery of eligible $SO_2$ allowance in the EPA Allowance Tracking System in accordance with assignment instructions from the Clearing Service Provider |
| Price Limits | 125 ticks ($625) up and down from the previous day's settlement |
| Reportable Position Limits | 1000 contracts, equivalent to 25,000 metric tons |
| Nearby Expiration Month Speculative Position Limits | 10,000 contracts, equivalent to 250,000 metric tons |
| Speculative Position Limits | Limits and hedge exemptions as specified by exchange rules |
| Applicable Regulatory Authorities | Subject to oversight pursuant to rules and regulations of the Commodities Futures Trading Commission |

Delivery is typically a three day process consisting of Position Day, Notice Day and Delivery Day. The three days generally occur over three consecutive business days.

The tenth trading day prior to a contract's expiration (expiration occurring after the close on the final trading day) is the first day that clearing members must report their long futures positions in the expiring contract. This day is termed Position Day. The long positions as of the close of business on the tenth trading prior to expiration, by trade date, must be reported to the Clearing Service Provider (CSP) in the time frame and format required by the CSP. Starting on the First Position Day, seller clearing members on behalf of their short futures position holders may submit delivery tender notices to the CSP in a format acceptable to the CSP.

On the business day after the delivery tender notice has been submitted and the delivery assignment made by the CSP, the seller clearing member provides to the buyer clearing member(s) a description of the underlying EPA emission allowances to be delivered. This day is termed Notice Day. The buyer clearing member(s) provides EPA registry account information to the seller clearing member. Information exchange is generally to be completed by a certain time, for example, 4:00 p.m. Central Time. The seller clearing member must typically have the appropriate emission allowances deposited in its EPA account by a certain time, for example, 5:00 p.m. Central Time.

During the morning of the next day at, for example, 6:40 a.m. Central Time, the CSP will issue payment instructions to the respective buyer clearing members for the full contract value based upon the Position Day's settlement price in a means and manner prescribed by the CSP. By another time, for example, 10:00 a.m. Central Time, the seller clearing member must electronically submit the allowance transfer instructions via the EPA's CAMD Business System. The seller clearing member must then forward the EPA confirmation to the CSP as verification that the delivery has been completed.

After delivery is completed, the CSP releases the delivery proceeds to the seller clearing member on the following exemplary schedule. If the EPA confirmation is received by the CSP prior to 12:45 p.m. Central Time, the proceeds are released on the same day in the mid-day variation cycle. If the EPA confirmation is received by the CSP after 12:45 p.m. Central Time, the proceeds are released on the next business day through the 6:40 a.m. Central Time settlement cycle. The seller may utilize revenues realized from the sale of the sulfur financial instrument to purchase equipment to reduce emissions, to become a more efficient producer resulting in reducing emissions, or to purchase other sulfur financial instruments.

FIG. 1 is a simplified block diagram of an emissions reduction and trading system 10 that may be managed by a sulfur dioxide futures exchange. The exchange promotes trading by, for example, approving parties based on predetermined criteria including at least one of creditworthiness, an emissions allowance amount, and membership in a regulatory organization. Buyers and seller can also report transfers of all or a portion of the sulfur financial instrument to the sulfur dioxide futures exchange, and in turn, the exchange monitors and approves at least one of the transfers and redemption of the sulfur financial instrument.

The system 10 can include a registry 12, a guarantee mechanism 16, and a trading host or platform 18. The system 10 can be coupled to a network 20, such as the Internet or any other public or private network or connections of computing devices. The system 10 can be communicatively coupled to an emissions database 22, either directly or via the network 20.

In an embodiment, a portion of the registry 12 serves as the official record of the sulfur financial instruments of each participant or entity in the commodity market managed by the system 10. Sales or trades of the sulfur financial instrument become officially acknowledged for compliance purposes only when they are reported by the buyer and by the seller to the registry 12. The registry 12 can also hold types of Carbon Financial Instruments, such as exchange allowances (XAs), exchange emission offsets (XOs) generated by mitigation projects, and exchange early action credits (XEs). Each of these instruments is recognized as equivalent when surrendered for compliance (which may be subject to certain constraints), and sulfur financial instruments may be used in compliance in their designated vintage year.

In an exemplary embodiment, the registry 12 is designed to provide secure Internet access by entities or participants to their own accounts. The registry 12 may be configured to provide access of accounts by the public, but this access would be on a read-only basis. Preferably, the registry 12 is configured with the ability to interface with registries in other greenhouse gas markets. The registry 12 is linked to the trading platform 18 and financial guarantee mechanism 16. The combination of these three components provides a clearinghouse system.

The guarantee mechanism 16 enhances market performance by ensuring that those who conduct sales of sulfur financial instruments on the trading platform 18 receive next-day payment even if the buyer fails to execute the payment process. This mechanism allows for anonymous trading by eliminating the need to address the credit worthiness of buyers. Non-payment risk is eliminated, thus removing a transaction cost. This feature allows the participation in trading by liquidity providers (including "market makers"), who can stand ready to promptly buy and sell. The presence of standing buyers and sellers increases trading activity, which improves the economic efficiency of the price discovery process. In addition, the ability to trade anonymously allows members to post bids and offers and execute trades without revealing their trading strategies. The guarantee mechanism 16 eliminates the risk that a buyer may fail to make payment.

The trading platform 18 is an electronic mechanism for hosting market trading that provides participants with a central location that facilitates trading, and publicly reveals price information. The trading platform 18 reduces the cost of locating trading counter parties and finalizing trades, an important benefit in a new market.

Note any of the functions, method steps or processes of the invention can be performed by one or more hardware or software devices, processes or other entities. These entities can reside in the same location or can reside remotely as, for example, entities interconnected by a digital network such as the Internet, a local area network (LAN), campus or home network, standalone system, etc. Although functions may have been described as occurring simultaneously, immediately or sequentially, other embodiments may perform the functions, steps or processes in a different order, or at substantially different times with respect to execution of other functions, steps or processes.

It will be understood that the systems and software described herein include, either explicitly or implicitly, software implemented on computers or other appropriate hardware, including such other intelligent data processing devices having processors, data storage means, and the ability to support an operating system, with or without user interfaces, for example, file servers, as may be useful in implementing this invention.

Preferred embodiments of the invention provide program product, which can cause a general-purpose computer to operate as a special-purpose computer, in accordance with the disclosure herein. Such program product implemented on a general-purpose computer constitutes an electronic customizing machine which can interact with a magnetically or optically cooperative computer-based input device enabling the computer to be customized as a special purpose computer, according to the contents of the software. To cause a computer to operate in such a customized, special-purpose mode, the software of the invention can be installed by a user or some other person, and will usually interact efficiently with the device on which it resides to provide the desired special-purpose functions or qualities, but only after the selection of configuration parameters which are often unique to the operating system(s) used by the computer. When so configured, the special-purpose computer device has an enhanced value, especially to the professional users for whom it may be intended.

It is to be understood that the terms "computer," "server," "data storage means," as well as cognate terms, denote either physical or logical instances of those entities. For instance, a computer, data storage means and server may be implemented as separate physical entities or as one physical entity performing logically separate functions. Similarly two servers may be implemented as separate physical entities or as one physical entity performing logically separate functions. Also, a computer may be envisaged as a "terminal" which will be understood to include mobile devices (e.g. mobile phones or PDAs) as well as stationary computers.

Finally, one of ordinary skill in the art would understand that, although a Sulfur Financial Instrument Futures Contract with particular specifications has been disclosed to illustrate the invention, some of the listed requirements may be modified or eliminated as needed. One of ordinary skill in the art would therefore understand that various changes and modifications could be made without departing from the spirit and scope of the invention as defined by the claims.

What is claimed is:

1. A computer-based method for promoting futures contracts trading related to sulfur dioxide emission allowances, which comprises performing by a computer a plurality of steps including:

creating, by said computer, a sulfur financial instrument that is a futures contract for use by approved parties, wherein the sulfur financial instrument states an amount of sulfur dioxide emission allowances, a vintage year for the allowances, and an expiration date for the instrument, with the stated vintage year being subsequent to the stated expiration date;

selling the sulfur financial instrument to an approved buyer who takes a market position to acquire the amounts of the sulfur dioxide emissions allowances; and giving instructions for delivering to the buyer one or more vintage years of sulfur dioxide emissions allowances which have vintage years that are current with or prior to the vintage year specified by the sulfur financial instrument and at least one of which has a vintage year subsequent to the expiration date.

2. The method of claim 1, wherein the approved parties are clearing participants or trading parties who have a sulfur dioxide registry account established with a central regulatory organization.

3. The method of claim 2, wherein the central regulatory agency is the Environmental Protection Administration (EPA).

4. The method of claim 1, wherein the parties are approved by a sulfur dioxide futures exchange based on predetermined criteria including at least one of creditworthiness, an emissions allowance amount, and membership in a regulatory organization.

5. The method of claim 1, further comprising delivering the allowances comprising the sulfur financial instrument if the seller does not engage in an offsetting trade.

6. The method of claim 5, wherein delivery of the allowances is facilitated by a clearing service provider that performs the contract if a trading party fails to timely do so.

7. The method of claim 6, wherein delivery of the allowances occurs over three consecutive business days.

8. The method of claim 7, wherein the days include a position day, notice day, and delivery day.

9. The method of claim 5, further comprising releasing payment to a seller after confirmation is received that a buyer has received the sulfur emissions allowances from a central regulatory agency.

10. The method of claim 1, further comprising receiving reports of transfers of all or a portion of the allowances comprising the sulfur financial instrument.

11. The method of claim 10, further comprising monitoring and approving at least one of the transfers and redemption of the sulfur financial instrument.

12. The method of claim 1, wherein the delivery date of the sulfur financial instrument or the allowances is prior to the stated expiration date.

13. The method of claim 12, wherein the sulfur financial instrument is a quarterly contract.

14. The method of claim 1, conducted over the Internet or any other public or private network or connections of computing devices.

15. A computer-readable media for promoting futures contracts trading related to sulfur dioxide emission allowances, which comprises instructions that when executed on a processor performs the steps comprising:

creating a sulfur financial instrument that is a futures contract for use by approved parties, wherein the sulfur financial instrument states an amount of sulfur dioxide emission allowances, a vintage year for the allowances, and an expiration date for the instrument, with the stated vintage year being subsequent to the stated expiration date;

selling the sulfur financial instrument on an exchange platform associated with a computer network to an approved buyer who takes a market position to acquire the amounts of the sulfur dioxide emissions allowances; and giving instructions for delivering to the buyer one or more vintage years of sulfur dioxide emissions allowances which have vintage years that are current with or prior to the vintage year specified by the sulfur financial instrument and at least one of which has a vintage year subsequent to the expiration date.

16. The computer-readable media of claim 15, wherein the network is the Internet.

17. The computer-readable media of claim 15, wherein the exchange platform is linked to a registry that stores records related to the sulfur emission allowances, and the registry is linked to a financial guarantee mechanism.

18. A computer system for futures contracts trading related to sulfur dioxide emission allowances, which comprises:

a server device configured to perform operations comprising:

creating a sulfur financial instrument that is a futures contract, wherein the sulfur financial instrument states an amount of sulfur dioxide emission allowances, a vintage year for the allowances, and an expiration date for the instrument, with the stated vintage year being subsequent to the stated expiration date;

trading the sulfur financial instrument on an electronic exchange; and receiving an instruction from a client device configured to perform operations comprising: sending an instruction to the server device to trade the futures contract.

19. The system of claim 18, wherein the futures contract is traded in consideration for an amount of funds that are usable by the seller to further reduce emissions by purchasing emission reduction equipment, to create efficiencies in a business, or to purchase another futures contract.

20. The system of claim 18, wherein the futures contract is a quarterly contract.

21. The system of claim 18 wherein the server further creates computer readable data representing the futures contract.

22. The system of claim 21, wherein the data comprises a field relating to a delivery procedure that sets forth a procedure for delivery of the sulfur emissions allowance.

23. The system of claim 21, wherein the data comprises a field relating to position limits.

24. The system of claim 18, further comprising a computer-implemented guarantee mechanism to ensure that a seller of the futures contract receives payment even if a buyer of the futures contract fails to execute the payment process.

25. The system of claim 18, wherein delivery of the allowances underlying the sulfur financial instrument comprises a process that occurs over three consecutive business days.

26. The method of claim 1, wherein the sulfur financial instrument also includes contract specifications comprising one or more of quotation, minimum tick increment, trading hours, first and last trading day, delivery process, price limits, reportable position limits, or nearby expiration month speculative position limits.

27. The method of claim 1, which further comprises basing settlement price on one or more of: (a) a single traded price during a pre-close; (b) if more than one trade occurs during the pre-close, the trade volume weighted average of trade prices, rounded to the nearest tick; (c) if no trade occurs during the pre-close, the volume weighted average of two prior trade prices; and (d) if there are no trades, a price midway between the best bid and offer (volume weighted) at the end of the pre-close rounded to the nearest tick.

28. The system of claim 18 which further includes an electronic registry, guarantee mechanism, and trading platform which are communicatively coupled to a network and a plurality of computing devices and optionally to an emissions database.

29. The system of claim 28, wherein the registry includes an official record of ownership of the sulfur financial instruments and also holds carbon financial instruments that include exchange allowances (XAs), exchange emission offsets (XOs) generated by mitigation projects, and exchange early action credits (XEs).

30. The system of claim 29 which further comprises providing an electronic clearing house for settlement of trades of sulfur financial instruments, wherein the clearing house includes the registry, trading platform and guarantee mechanism, and which further comprises providing anonymous trading without disclosing a strategy and with participation by market makers.

* * * * *